United States Patent [19]
Iijima et al.

[11] Patent Number: 5,878,675
[45] Date of Patent: Mar. 9, 1999

[54] FLUE GAS DESULFURIZER, BOILER EQUIPMENT AND THERMAL ELECTRIC POWER GENERATION EQUIPMENT

[75] Inventors: Masaki Iijima; Atsushi Tatani; Kazuaki Kimura; Koichiro Iwashita; Satoshi Yajima, all of Tokyo; Toru Takashina; Susumu Okino, both of Hiroshima-ken, all of Japan

[73] Assignee: Mitsubishi Jukogyo Kabushiki Kaisha, Tokyo, Japan

[21] Appl. No.: 696,317

[22] Filed: Aug. 12, 1996

[30] Foreign Application Priority Data

Oct. 13, 1995 [JP] Japan ................................ 7-265287
Oct. 16, 1995 [JP] Japan ................................ 7-266626

[51] Int. Cl.$^6$ .............................. F23J 15/00; F23B 7/00; F01K 7/34; F22D 1/40
[52] U.S. Cl. .......................... 110/215; 110/203; 110/234; 60/678; 60/691; 122/1 C; 122/420; 422/168; 422/173
[58] Field of Search ...................................... 110/203, 215, 110/345, 234; 422/168, 169, 173, 175, 177, 198, 200, 201, 224, 225, 229, 231, 234, 235; 122/1 A, 1 C, 5, 20 B, 420, 421; 60/678, 691

[56] References Cited

U.S. PATENT DOCUMENTS

| | | | |
|---|---|---|---|
| 3,812,793 | 5/1974 | Solomon | 110/215 |
| 3,997,294 | 12/1976 | Kritzler | 422/175 |
| 4,305,909 | 12/1981 | Willett et al. | 422/169 |
| 4,489,679 | 12/1984 | Holt | 122/451 S |
| 4,533,522 | 8/1985 | Leimkuhler | 422/170 |
| 4,660,511 | 4/1987 | Anderson | 122/420 |
| 4,670,221 | 6/1987 | Marnet et al. | 422/107 |
| 4,686,940 | 8/1987 | Fullemann | 122/31 R |
| 4,999,167 | 3/1991 | Skelley et al. | 422/175 |
| 5,094,826 | 3/1992 | Paikert et al. | 423/242 |
| 5,339,755 | 8/1994 | Smith | 110/345 |
| 5,510,087 | 4/1996 | Johnson et al. | 422/173 |
| 5,534,230 | 7/1996 | Johnson et al. | 422/173 |
| 5,553,555 | 9/1996 | Gosselin, Jr., et al. | 110/215 |
| 5,641,460 | 6/1997 | Okazoe et al. | 422/171 |

FOREIGN PATENT DOCUMENTS

| | | | |
|---|---|---|---|
| 0298039A2 | 1/1989 | European Pat. Off. | B01D 53/34 |
| 0499664A1 | 8/1992 | European Pat. Off. | B01D 53/34 |
| 0543767A1 | 5/1993 | European Pat. Off. | C04B 40/02 |
| 4307608A1 | 9/1994 | Germany | B01D 53/34 |
| 63 004 835 | 1/1988 | Japan . | |

OTHER PUBLICATIONS

Patent Abstracts of Japan, vol. 12, No. 202, (JP63004835), Jun. 10, 1988.
Air Products and Chemicals, Inc., "Pure Air: Bailley Station Advanced Flue Gas Desulfurization Project", World Wide Web (http://www.airproducts.com/ees/pureair.html#pure), pp. 1–4, 1996.

*Primary Examiner*—Ira S. Lazarus
*Assistant Examiner*—Ljiljana V. Ciric
*Attorney, Agent, or Firm*—Alston & Bird LLP

[57] ABSTRACT

A flue gas desulfurizer having an absorption tower for bringing untreated flue gas into gas-liquid contact with an absorbent slurry, wherein there is provided heat recovery means for recovering heat from the flue gas passing through the flue gas inlet section of the absorption tower prior to gas-liquid contact, and to boiler equipment including heat release means for releasing the recovered heat to heat utilization equipment. This invention also relates to thermal electric power generation equipment including extraction feedwater heaters for heating boiler feedwater with steam from steam turbines, a flue gas desulfurizer using an absorbent slurry, and means for recovering heat from the flue gas passing through the flue gas desulfurizer and/or the absorbent slurry within the flue gas desulfurizer, whereby boiler feedwater is preheated by the recovered heat and then introduced into the extraction feedwater heaters.

3 Claims, 5 Drawing Sheets

FLUE GAS DESULFURIZER, BOILER EQUIPMENT AND THERMAL ELECTRIC POWER GENERATION EQUIPMENT

BACKGROUND OF THE INVENTION

This invention relates to a flue gas desulfurizer to be added to boiler equipment or the like, and to boiler equipment for utilizing the recovered heat in lower heat utilization equipment.

This invention also relates to thermal electric power generation equipment provided with a steam extraction feedwater heater for the steam turbine and with a flue gas desulfurizer.

Generally, a flue gas desulfurizer is used to remove sulfur oxides ($SO_x$) and other gases present in flue gas from boiler equipment and discharge the resulting clean gas into the atmosphere.

FIG. 5 is a schematic view showing the typical construction of boiler equipment provided with such a flue gas desulfurizer and the temperature and moisture content of flue gas at various points.

Flue gas discharged from a boiler 1 is freed of nitrogen oxides ($NO_x$) in a denitrator 2 attached to boiler 1, passed through an air heater (AH) 3 and the heat recovery section 4 of a gas-gas heater (GGH), and introduced into an electrostatic precipitator (EP) 5 where dust such as fly ash is removed therefrom. Then, by means of an induced draft fan (IDF) 6, the flue gas is introduced into a desulfurizer 7 where sulfur dioxides (predominantly sulfur dioxide) are removed therefrom. Thereafter, the flue gas is passed through the reheating section 8 of the gas-gas heater (GGH) and then discharged from a stack 10 into the atmosphere by means of a back-up fan (BUF) 9.

As the flue gas desulfurizer 7 used for this purpose, one of the wet absorption type in which flue gas is brought into a gas-liquid contact with an absorbent slurry so as to absorb and remove sulfur dioxide present in the flue gas is widely used in recent years because of its high degree of desulfurization and the like.

The temperature of the flue gas is typically about 135° C. just behind air heater (AH) 3 and, when coal is used as the fuel, its moisture content is about 8%. Immediately before the inlet of flue gas desulfurizers 7, the temperature of the flue gas is lowered to about 90° C. as a result of cooling in heat recovery section 4, and the like. In flue gas desulfurizer 7, the temperature of the flue gas is further lowered by contact with an absorbent slurry and, in the case of a coal-fired boiler, typically reaches about 48° C. So long as no particular heat recovery or the like is effected in flue gas desulfurizer 7, the temperature of the flue gas at the outlet of flue gas desulfurizer 7 depends on the flow rate and temperature of the introduced flue gas, the gas-liquid contact capacity of flue gas desulfurizer 7, and the like. Since this gas-liquid contact capacity and the like are preset according to the properties (such as sulfur dioxide concentration) of the flue gas, the temperature of the flue gas at the outlet of flue gas desulfurizer 7 eventually depends almost uniquely on the properties of the fuel. For example, this temperature is typically about 48° C. when coal is used as the fuel.

Since water present in the absorbent slurry evaporates to saturation in flue gas desulfurizer 7, the moisture content of the flue gas at the outlet of flue gas desulfurizer 7 is equal to the saturation level at 48° C. (i.e., about 11%). In the case of a coal-fired boiler of the 1,000 MW class, the amount of water evaporated in the absorption tower of flue gas desulfurizer 7 is about 75 t/h.

Finally, the flue gas is heated to about 90° C. in reheating section 8 and discharged from stack 10.

It is practically impossible to effect additional heat recovery by lowering the temperature of the flue gas to less than 90° C. in heat recovery section 4, though this improves the performance of electrostatic precipitator 5 itself. Specifically, if the temperature of the flue gas is less than 90° C., there is a possibility that the saturation temperature will be locally reached to produce steam condensate. This moisten the ash recovered by electrostatic precipitator 5 and makes its reuse very difficult. Moreover, in order to provide corrosion resistance to steam condensate, an expensive corrosion-resistant material needs to be used for components such as the ducts extending from heat recovery section 4 to flue gas desulfurizer 7, and induced draft fan 6.

Furthermore, the temperature of the flue gas must be raised to about 90° C. in reheating section 8. Its purpose is to prevent the corrosion of downstream equipment, prevent the flue gas discharged into the atmosphere from being converted to white smoke, and secure its diffusibility. Specifically, unless the temperature of the flue gas is raised to about 90° C. or above, there is a possibility that steam condensate will be produced, and an expensive corrosion-resistant material needs to be used for components such as the ducts extending to stack 10, and back-up fan 9. Moreover, the flue gas discharged into the atmosphere tends to be converted to white smoke, and its desired diffusibility is not obtained. Consequently, when the temperature of the flue gas is so low that its satisfactory diffusibility is not obtained and the smoke does not rise high, the height of the stack itself needs to be increased so as to meet the emission requirements.

Meanwhile, in equipment using boilers (e.g., thermal electric power generation equipment), the fullest utilization of thermal energy produced in boilers is increasingly required in recent years from the viewpoint of the effective utilization of resources. Thus, it is desirable to operate heat utilization systems, such as greenhouses, heated swimming pools and district heating systems, by use of surplus heat. However, in spite of various improvements conventionally made to achieve higher efficiency, it has been very difficult to recover heat from boiler equipment.

Also in flue gas treatment systems, it is problematic from a practical point of view, as described above, to cool the flue gas to less than the current level, for example, on the outlet side of the boiler. Thus, heat recovery has conventionally been considered to be difficult.

Moreover, in flue gas desulfurizers, the absorbent slurry needs to be replenished with water in an amount which is evaporated and carried away by the flue gas, resulting in the requirement of a large amount of industrial water. At the same time, such steam increases the total amount of the flue gas, causing an increase in the power consumption of the back-up fan and the size of the ducts extending to the stack.

Furthermore, in the prior art, thermal electric power generation equipment has been repeatedly improved until now in order to achieve higher efficiency. Generally, such equipment includes a plurality of high-pressure, intermediate-pressure and low-pressure steam turbines and a large number of extraction feedwater heaters for heating boiler feedwater successively by use of steam extracted from various points of each turbine. However, it has been very difficult to further enhance the thermal efficiency in the complicatedly constructed steam cycle system of thermal electric power generation equipment.

SUMMARY OF THE INVENTION

Accordingly, it is an object of the present invention to provide a flue gas desulfurizer and boiler equipment which overcome the above-described disadvantages, make it possible to recover thermal energy effectively from flue gas and utilize it effectively without modifying the basic construction of the flue gas desulfurizer and the boiler equipment, and can reduce the amount of water used for the absorbent slurry.

A flue gas desulfurizer in accordance with the present invention has an absorption tower for bringing untreated flue gas into gas-liquid contact with an absorbent slurry, and includes heat recovery means for recovering heat from the flue gas passing through the flue gas inlet section of the absorption tower prior to gas-liquid contact. In one embodiment thereof, the flue gas desulfurizer of the present invention also includes heat recovery means for recovering heat from the absorbent slurry circulating through the absorption tower. In another embodiment of the flue gas desulfurizer of the present invention, the amount of heat recovered by the heat recovery means is preset so that the temperature of the treated flue gas discharged from the flue gas outlet section of the absorption tower will not be higher than the saturation temperature for the moisture content of the untreated flue gas.

Boiler equipment in accordance with the present invention includes a flue gas desulfurizer having an absorption tower for bringing flue gas produced in a boiler into gas-liquid contact with an absorbent slurry, heat recovery means for recovering heat from the flue gas passing through the absorption tower and/or the absorbent slurry circulating through the absorption tower, heat transport means for transporting the heat recovered by the heat recovery means to heat utilization equipment, and heat release means for releasing the heat transported by the heat transport means as an energy source for the heat utilization equipment.

In one embodiment of the boiler equipment of the present invention, the aforesaid heat recovery means recovers heat at least from the flue gas passing through the flue gas inlet section of the absorption tower prior to gas-liquid contact. In another embodiment of the boiler equipment of the present invention, the amount of heat recovered by the heat recovery means is preset so that the temperature of the treated flue gas discharged from the flue gas outlet section of the absorption tower will not be higher than the saturation temperature for the moisture content of the untreated flue gas.

When a flue gas desulfurizer is provided with means for recovering heat from the flue gas passing through the flue gas inlet section of the absorption tower thereof prior to gas-liquid contact, a high degree of heat recovery can be achieved and, at the same time, the amount of steam generated in the absorption tower can be reduced. This makes it possible to reduce the amount of water used and the power consumption of the back-up fan located behind the absorption tower, or decrease the size of equipment installed on the downstream side of the absorption tower. Moreover, since the temperature of the absorbent slurry within the absorption tower is steadily lowered, the reactivity in the absorption reaction of sulfur oxides is enhanced to bring about an improvement in desulfurization performance.

Moreover, when heat is recovered from the flue gas passing through the absorption tower of the flue gas desulfurizer and/or the slurry within the absorption tower, the amount of water evaporated from the slurry within the absorption tower and carried away by the flue gas can be reduced to approximately zero by presetting the amount of heat recovered by the heat recovery means so that the temperature of the treated flue gas discharged from the outlet of the absorption tower will not be higher than the saturation temperature for the moisture content of the untreated flue gas. Thus, the amount of water used can be reduced markedly.

The thermal energy recovered from the flue gas in the flue gas desulfurizer can be utilized as an energy source for lower heat utilization equipment. Consequently, the effective utilization of thermal energy can practically and readily be achieved without modifying the boiler and the equipment associated therewith. For example, when heat is recovered from the absorption tower, heat utilization systems such as greenhouses, heated swimming pools and district heating systems can be extended or newly constructed without requiring any alteration such as an increase in boiler capacity. Moreover, additional heat recovery can be effected even in thermal electric power generation equipment and the like wherein further energy recovery has conventionally been regarded as impossible from a practical point of view.

Furthermore, such heat recovery does not interfere with the operation of the boiler equipment or the flue gas desulfurizer, but is effective, for example, in reducing the amount of water used in the flue gas desulfurizer.

It is another object of the present invention to provide thermal electric power generation equipment which can effectively recover thermal energy from flue gas produced in a boiler without modifying the basic construction of the steam cycle system, and can reduce the amount of water used.

Thermal electric power generation equipment in accordance with the present invention includes a plurality of extraction feedwater heaters for heating boiler feedwater with a part of the steam extracted from steam turbines, a flue gas desulfurizer having an absorption tower for bringing flue gas produced in a boiler into gas-liquid contact with an absorbent slurry to remove sulfur oxides present in the flue gas, and means for recovering heat from the flue gas passing through the absorption tower and/or the absorbent slurry within the absorption tower, whereby boiler feedwater is preheated by the recovered heat and then introduced into the extraction feedwater heaters.

In the thermal electric power generation equipment of the present invention, the boiler feedwater can be preheated by using one or more heat exchangers as the heat recovery means and disposing the heat exchangers at one or more positions selected from the flue gas inlet section of the absorption tower, the inside of the packing material, the inside of the bottom tank, the circulation system of the absorbent slurry, and the flue gas outlet section. Among others, the boiler feedwater can be more efficiently heated by disposing such a heat exchanger in the flue gas inlet section of the absorption tower.

By providing means for recovering heat from the flue gas passing through the absorption tower of the flue gas desulfurizer and/or the slurry within the absorption tower and using the recovered heat to preheat boiler feedwater prior to introduction into the extraction feedwater heaters, the amount of steam extracted from the steam turbines can be reduced. As a result, the power output of the steam turbines can be improved beyond the conventionally recognized limits. Thus, additional heat recovery can be effected in thermal electric power generation equipment wherein it has conventionally been regarded as impossible to achieve higher efficiency, and the electric power output can hence be improved without requiring any alteration such as an increase in boiler capacity.

Especially when a heat exchanger for recovering heat from the flue gas passing through the flue gas inlet section of the absorption tower prior to gas-liquid contact is employed as the heat recovery means, a high degree of heat recovery can be achieved to cause a marked increase in power output.

Moreover, such heat recovery does not interfere with the operation of the flue gas treatment system, but can reduce the amount of water used owing to a temperature drop of the absorption tower of the flue gas desulfurizer.

DESCRIPTION OF THE PREFERRED EMBODIMENTS

Several embodiments of the present invention are described hereinbelow with reference to the accompanying drawings.

Figure 1:
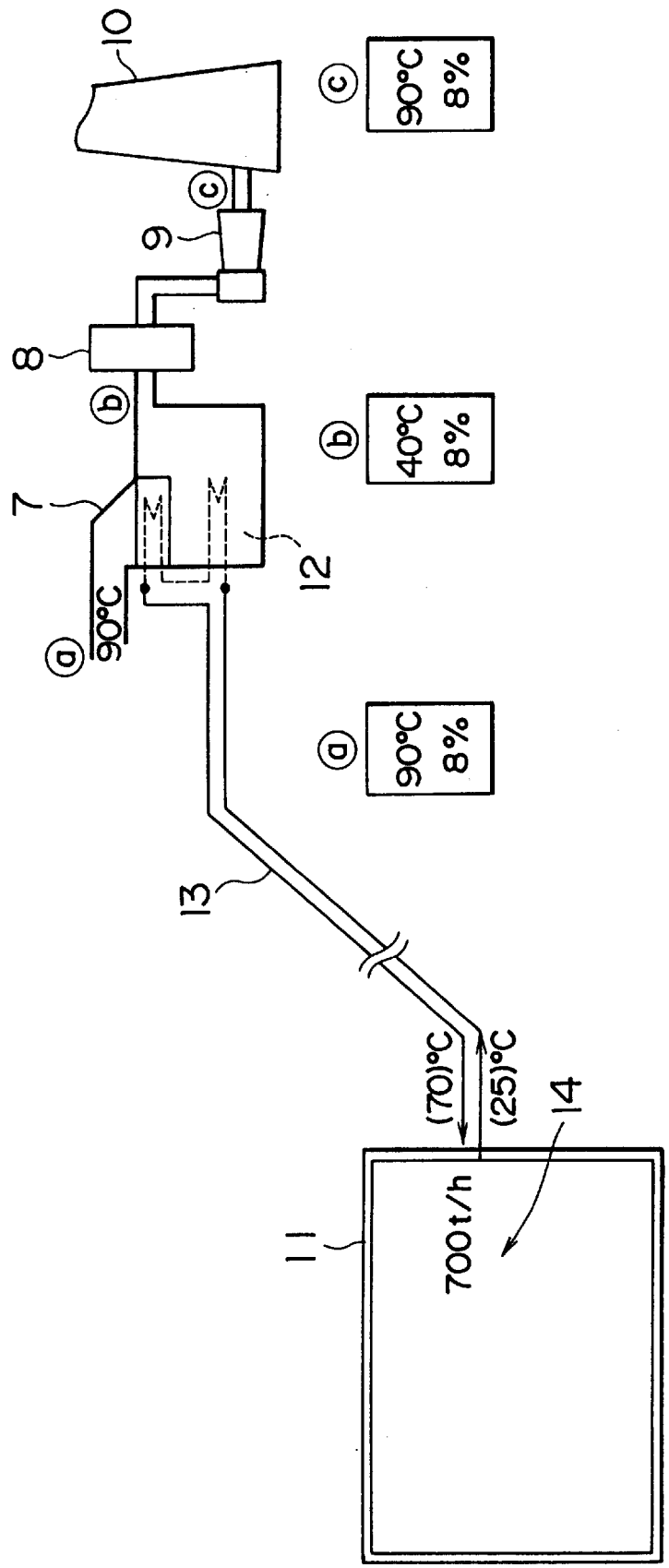
FIG. 1 is a schematic view showing an example of the general construction of boiler equipment embodying the present invention and also showing the temperatures and moisture contents of flue gas at various points as calculated from the amount of water evaporated on a 1,000 MW basis.
Figure 2:
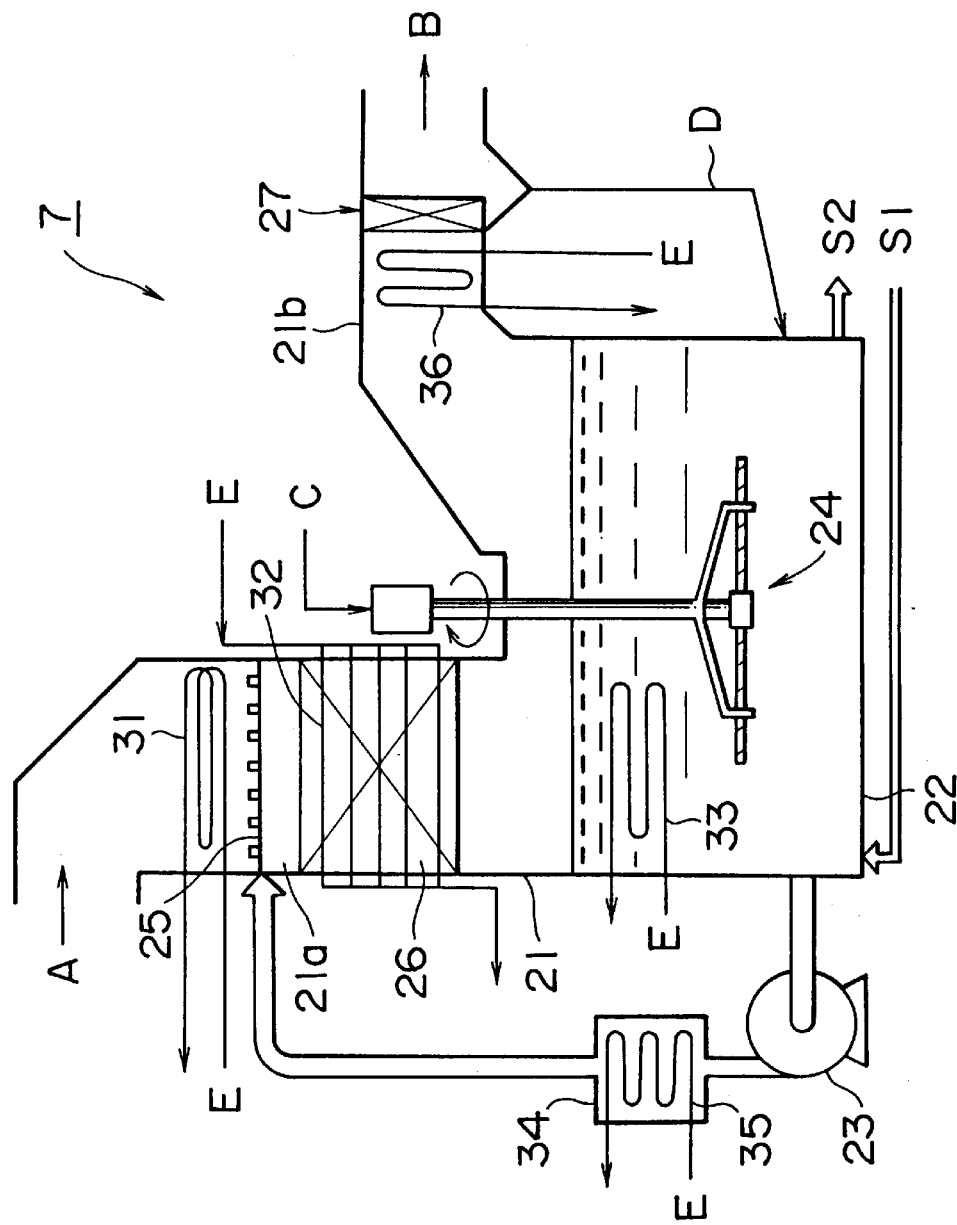
FIG. 2 is a schematic view showing an example of the general construction of a flue gas desulfurizer embodying the present invention and also showing various embodiments of the heat recovery means.
Figure 5:
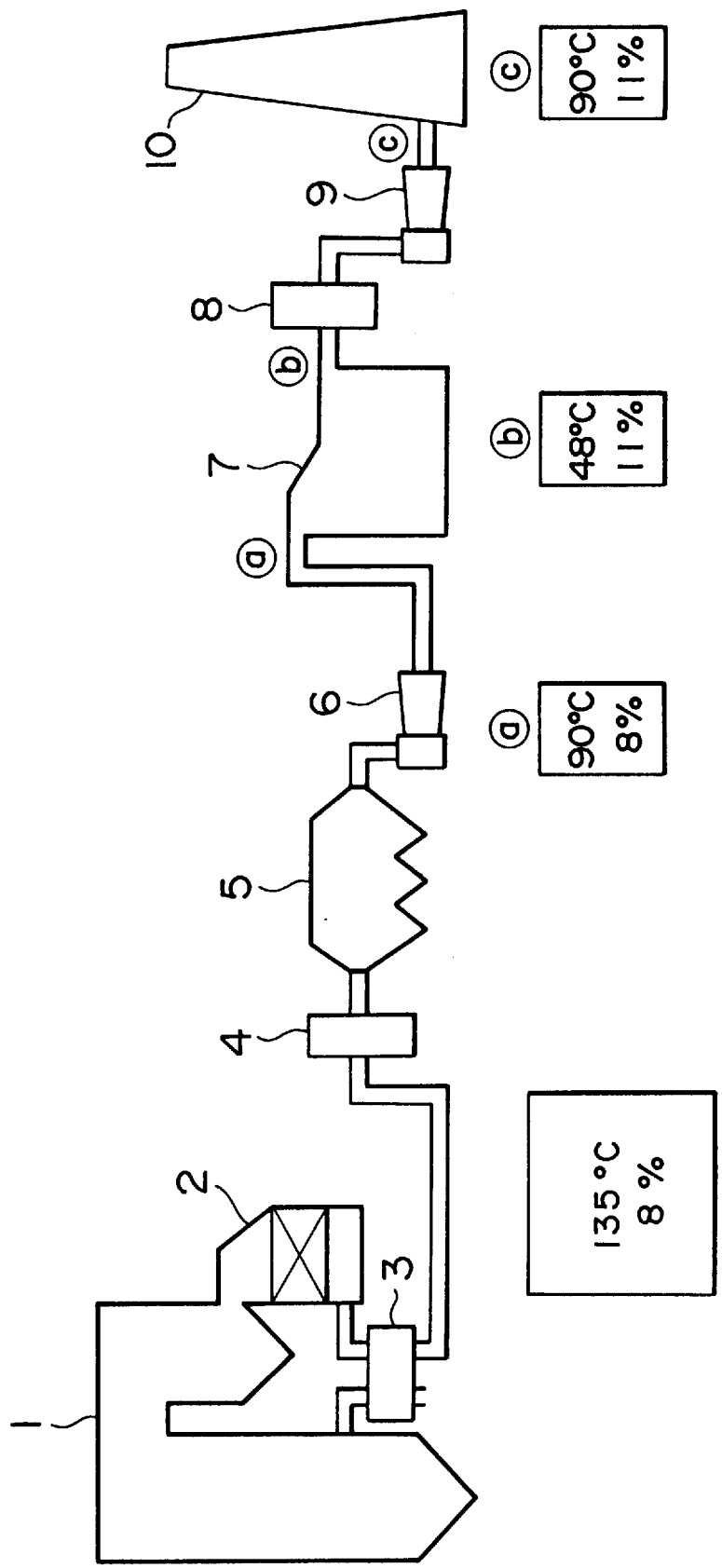
FIG. 5 is a schematic view showing of the typical construction of conventional boiler equipment including a flue gas desulfurizer and also showing the temperatures and moisture contents of flue gas at various points.

FIG. 1 is a schematic view showing a part of boiler equipment for supplying the heat recovered from a flue gas desulfurizer to lower heat utilization equipment 11 according to the present invention, and also showing the temperatures and moisture contents of flue gas at various points. FIG. 2 is a schematic view showing an example of the construction of an essential part of a flue gas desulfurizer to which the present invention is applied, and also showing various heat recovery means. In these figures, elements similar to those included in the conventional boiler equipment shown in FIG. 5 are designated by the same reference numerals, and the explanation thereof is omitted unless occasion demands.

In the recovered heat utilization equipment of the present invention, the heat energy recovered from a flue gas desulfurizer 7 is supplied to lower heat utilization equipment 11 such as greenhouses, heated swimming pools and district heating systems, and utilized as an energy source therefor, as shown in FIG. 1. Specifically, flue gas desulfurizer 7 is provided with heat recovery means 12, heat transport means 13 for transporting the recovered heat to lower heat utilization equipment 11, and heat release means 14 for releasing the transported heat as an energy source for lower heat utilization equipment 11. Moreover, surplus steam and/or effluent steam from the boiler equipment may be used as part of the aforesaid energy source in combination with the recovered heat.

As shown in FIG. 2, flue gas desulfurizer 7 is of the tank oxidation type. Specifically, an absorbent slurry S1 (e.g., a limestone slurry) is supplied from a bottom tank 22 to header pipes 25 disposed in the flue gas inlet section 21a of an absorption tower 21 by means of a circulating pump 23, and injected into untreated flue gas A to absorb and remove sulfur dioxide present in the flue gas. The resulting flue gas is discharged from a flue gas outlet section 21b as treated flue gas B. On the other hand, the absorbent slurry injected from header pipes 25 further absorbs sulfur dioxide while flowing downward through the packing material 26 of absorption tower 21, and is accumulated in tank 22. Tank 22 is equipped with a rotating arm type air sparger 24 which is rotated horizontally by means of a motor (not shown) to blow air C into tank 22 in the form of fine bubbles while agitating the slurry. Thus, the absorbent slurry having sulfur dioxide absorbed therein is brought into efficient contact with the air to effect the neutralization reaction and form gypsum as a result of complete oxidation.

The predominant reaction occurring in the flue gas desulfurizer are as follows.
(Absorption tower)

$$SO_2 + H_2O \rightarrow H^+ + HSO_3^- \tag{1}$$

(Tank)

$$H^+ + HSO_3^- + (\tfrac{1}{2})O_2 \rightarrow 2H^+ + SO_4^{2-} \tag{2}$$

$$2H^+ + SO_4^{2-} + CaCO_3 + H_2O \rightarrow CaSO_4 \cdot 2H_2O + CO_2 \tag{3}$$

The slurry S2 having suspended therein gypsum and a small amount of limestone used as the absorbent is withdrawn from tank 22 by means of a slurry pump (not shown) and fed to a solid-liquid separator (not shown), where it is filtered to recover gypsum having a low water content as a by-product.

A mist eliminator 27 for removing any mist from the outgoing treated flue gas B is installed in the flue gas outlet section 21b of absorption tower 21. The mist is returned to tank 22 as recovered water D.

The water separated in the aforesaid solid-liquid separator is recycled to a tank for absorbent slurry S1 (not shown) and reused as water constituting the absorbent slurry. Usually, part of the recycled water is suitably withdrawn and disposed of so that impurities (such as chlorine) exerting an adverse influence on the absorption reaction of sulfur dioxide and the formation reaction of gypsum may not accumulate therein. If necessary, industrial water is suitably supplied to the recycled water.

In the present invention, the amount of water carried away as a result of evaporation in the absorption tower is markedly smaller than that in the conventional process, as will be described later. Consequently, the aforesaid make-up water is also reduced significantly.

Next, the heat recovery means 12 of flue gas desulfurizer 7 is more specifically explained with reference to FIG. 2. As heat recovery means 12, there may be used, for example, one or more heat exchangers for effecting heat exchange between a circulating heating medium (i.e., boiler feedwater) E and the flue gas and/or absorbent slurry within the absorption tower 21 of flue gas desulfurizer 7.

In this case, a reduction in cost can be achieved, for example, by using industrial water containing anticorrosive and antifreezing agents as the heating medium.

Various examples of the heat recovery means can be employed as shown in FIG. 2. They include (i) a heat exchanger comprising a heat transfer tube 31 disposed upstream of header pipes 25 in the flue gas inlet section 21a of absorption tower 21 in order to recover heat from untreated hot flue gas A prior to contact with the absorbent slurry; (ii) a heat exchanger comprising a heat transfer tube 32 disposed downstream of header pipes 25 of absorption tower 21 (for example, within packing material 26) in order to recover heat from the flue gas having undergone gas-liquid contact and from the slurry; (iii) a heat exchanger comprising a heat transfer tube 33 disposed in the slurry within the tank 22 of absorption tower 21 in order to recover heat from the slurry; (iv) a heat exchanger 34 comprising a heat transfer tube 35 installed in the discharge line and/or suction line of circulating pump 23 for delivering the absorbent slurry from tank 22 to header pipes 25, in order to recover heat from the absorbent slurry; and (v) a heat exchanger comprising a heat transfer tube 36 disposed in the flue gas outlet section 21b of absorption tower 21 (for example, upstream of mist eliminator 27 or within the element of mist eliminator 27) in order to recover heat from flue gas B passing through flue gas outlet section 21b.

Heat recovery means 12 may comprise any one of the above-described heat exchangers or a plurality of such heat exchangers, for example, connected in series. However, in order to achieve a relatively high degree of heat recovery, the heat recovery means 12 should preferably include a heat exchanger (comprising heat transfer tube 31) for recovering heat from untreated flue gas A prior to contact with the absorbent slurry.

Moreover, the amount of heat recovered by heat recovery means 12 should preferably be preset so that the temperature of treated flue gas B finally discharged from absorption tower 21 will not be higher than the saturation temperature for the moisture content of untreated flue gas A. For example, when the moisture content of untreated flue gas A is 8%, it is preferable to design the heat exchanger(s) and control the circulation rate of heating medium E so that the temperature of treated flue gas B will be about 40° C. or below.

Furthermore, this heat recovery means 12 may be provided with control means (not shown) for automatically adjusting the amount of heat recovered to the aforesaid target value. For example, this control means may consist of a concentration sensor for detecting the moisture content of untreated flue gas A, a temperature sensor for detecting the gas temperature of treated flue gas B discharged from the flue gas outlet section 21a of absorption tower 21, a flow control valve for regulating the flow rate of the aforesaid heating medium E, and a controller for calculating a target temperature from the detected value of the aforesaid concentration sensor and controlling the opening of the aforesaid flow control valve so that the detected value of the aforesaid temperature sensor will be maintained in the vicinity of this target value.

Heat transport means 13 for transporting the recovered heat to lower heat utilization equipment 11 may comprise, for example, piping for conveying heating medium E under thermal insulation against its surroundings, and a feed pump.

Heat release means 14 may comprise a heat exchanger for releasing the heat of heating medium E in lower heat utilization equipment 11, such as a heat exchanger for heating the air within a greenhouse or a heat exchanger for heating the water of a swimming pool.

In the flue gas desulfurizer or boiler equipment constructed in the above-described manner, heat recovery means 12 functions to recover heat from the flue gas passing through absorption tower 21 and/or the absorbent slurry circulating through absorption tower 21, and lower heat utilization equipment 11 can be effectively operated by using this heat. Alternatively, lower heat utilization equipment 11 can also be operated by using surplus steam or effluent steam from the boiler equipment in combination with the heat recovered from the flue gas desulfurizer.

When a heat exchanger (comprising heat transfer tube 31) for recovering heat from untreated flue gas A prior to contact with the absorbent slurry is employed as heat recovery means 12, the evaporation in the succeeding gas-liquid contact region can be suppressed in proportion to the degree of cooling of the flue gas, and the steady-state temperature of the slurry within the absorption tower and the steady-state temperature of treated flue gas B can also be lowered correspondingly. Especially when the temperature of the flue gas in the flue gas outlet section of the flue gas desulfurizer is preset at a value (e.g., 40° C. or below) which is not higher than the saturation temperature for the moisture content of untreated flue gas A, the evaporation in the downstream gas-liquid contact region is theoretically zero, and the steady-state temperature of the slurry within the absorption tower and the steady-state temperature of treated flue gas B are equilibrated at that saturation temperature or below. Actually, they are affected by the heat generated by the reactions within tank 22, but its effect is very slight and little worth consideration.

Even when a heat exchanger (comprising heat transfer tube 32) for recovering heat from the flue gas present downstream of header pipes 25 (e.g., within packing material 26) and from the absorbent slurry, a heat exchanger (comprising heat transfer tube 33) for recovering heat from the absorbent slurry within tank 22, or a heat exchanger (comprising heat transfer tube 35) for recovering heat from the absorbent slurry in the pipeline for circulating it, is employed as heat recovery means 12, the heat transmitted, or to be transmitted, from the flue gas to the slurry is recovered continuously. In a steady state, therefore, the evaporation in the gas-liquid contact region can be suppressed in proportion to the degree of cooling, and the steady-state temperature of the slurry within the absorption tower and the steady-state temperature of treated flue gas B can also be lowered correspondingly. Also in this case, if the amount of heat recovered by the heat exchanger is preset so that the temperature of the slurry and the flue gas within the absorption tower will not be higher than the saturation temperature for the moisture content of untreated flue gas A (e.g., 40° C. or below), the evaporation in the gas-liquid contact region is theoretically zero.

When a heat exchanger (comprising heat transfer tube 36) for recovering heat from the flue gas passing through the flue gas outlet section 21b of absorption tower 21 is employed as heat recovery means 12, steam is once generated in the flue gas inlet section 21a of absorption tower 21 as a result of the gas-liquid contact of untreated flue gas A with the slurry. Unless other heat exchangers are installed, the temperature of the slurry and the flue gas within the absorption tower is similar to that observed in the prior art (e.g., 48° C.) and the moisture content is also similar to that observed in the prior art (e.g., 11%). However, this flue gas is cooled in flue gas outlet section 21b, so that the water once evaporated is condensed in flue gas outlet section 21b in proportion to the degree of cooling and recovered by mist eliminator 27. Eventually, the amount of water evaporated and carried away from the slurry within the absorption tower is reduced markedly. Especially when the temperature on the outlet side of this heat exchanger (i.e., the temperature of treated flue gas B) is preset at a value (e.g., 40° C. or below) which is not higher than the saturation temperature for the moisture content (e.g., 8%) of untreated flue gas A, all of the water once evaporated is theoretically recovered as condensate and the amount of water evaporated and carried away from the slurry within the absorption tower is zero.

When a combination of various heat exchangers described as above is employed as heat recovery means 12, the evaporation (i.e., the amount of water evaporated and carried away from the slurry) can also be reduced in proportion to the overall degree of cooling by heat recovery. Moreover, the evaporation can be reduced to zero by properly presetting the amount of heat recovered.

The following various effects are produced by employing the construction which has been described above with reference to FIGS. 1 and 2.

(1) Thermal energy can be recovered from flue gas produced in a boiler and utilized effectively without altering the basic construction of the current boiler and equipment associated therewith. Especially when a heat exchanger for recovering heat from untreated flue gas A prior to contact with the absorbent slurry is employed as heat recovery means 12, a high degree of heat recovery can be achieved as a result of heat exchange with untreated flue gas A having the highest temperature.

For example, when a heat exchanger for recovering heat from untreated flue gas A (having a temperature of about 90° C.) prior to contact with the absorbent slurry is employed as heat recovery means 12 for a coal-fired boiler of the 1,000 MW class, the calculated temperature of the heating medium in heat release means 14 is about 70° C. (see FIG. 1), provided that the flue gas is cooled to the saturation temperature (i.e., about 40° C.) by circulating the heating medium (i.e., water) at a flow rate of about 700 t/h. Thus, the recovered heat is sufficient for use as a heat source for greenhouses, heated swimming pools and the like.

(2) Since the amount of water evaporated from the absorbent slurry in the absorption tower is markedly decreased, the amount of water supplied to the flue gas desulfurizer (i.e., the amount of water used therein) can be reduced significantly.

Especially when the amount of heat recovered is present so that the temperature of treated flue gas B will not be higher than the saturation temperature for the moisture content of untreated flue gas A, the moisture content of treated flue gas B is equal to or less than that of untreated flue gas A and the evaporation in the absorption tower (strictly speaking, the amount of water evaporated and carried away from the absorption tower) is zero. Consequently, about 75 t/h of water can be saved in the case, for example, of a coal-fired boiler of the 1,000 MW class.

(3) Since the amount of water evaporated from the absorbent slurry in the absorption tower is markedly decreased, the total amount of gas which must be withdrawn from the absorption tower and discharged into the atmosphere through the stack (i.e., treated flue gas B) can be reduced significantly. Consequently, if the cross-sectional areas of the flow paths in the absorption tower and mist eliminator 27 and further in the duct extending to reheating section 8 or stack 10 are maintained at the current levels, the capacity (or power consumption) of back-up fan 9 can be significantly decreased because of a marked reduction in pressure loss. Alternatively, if the capacity (or power consumption) of back-up fan 9 is maintained at the current level, the cross-sectional areas of the flow paths in the absorption tower and the like can be decreased significantly and, therefore, the size of the equipment can be reduced. In the case, for example, of a coal-fired boiler of the 1,000 MW class, the moisture content of the treated flue gas can be decreased from 11% to 8% or less by lowering its temperature from the conventional level of 48° C. to 40° C. This means that the total amount of the treated flue gas is decreased by 3% or more.

(4) When a heat exchanger comprising a heat transfer tube 32 disposed within the packing material 26 of absorption tower 21 is employed as heat recovery means 12, the temperature of packing material 26 can be kept lower than that of the slurry and flue gas passing therethrough, so that little water evaporates at the surfaces of packing material 26. Consequently, the soluble components of the slurry are prevented from precipitating as a result of evaporation to form scale, and the undesirable deposition of scale on packing material 26 can be avoided.

(5) When a heat exchanger installed in the discharge line or suction line of circulating pump 23 is employed as heat recovery means 12, heat can be recovered from the current flue gas desulfurizer by making a simple alteration which comprises, for example, connecting a ready-made heat exchanger in the line.

(6) When a heat exchanger comprising a heat transfer tube 36 disposed in the flue gas outlet section 21b of absorption tower 21 (i.e., upstream of mist eliminator 27 or within the element of mist eliminator 27) is employed as heat recovery means 12, fine dust remaining in treated flue gas B passing through this flue gas outlet section 21b can further be removed.

Specifically, in the flue gas inlet section 21a of absorption tower 21, steam is once generated as a result of the gas-liquid contact of untreated flue gas A with the slurry. Unless other heat exchanges are installed, the temperature of the slurry and flue gas within the absorption tower is similar to that observed in the prior art (e.g., 48° C.) and the moisture content is also similar to that observed in the prior art (e.g., 11%). However, this flue gas is cooled in flue gas outlet section 21b, and its temperature finally reaches a value (e.g., 40° C. or below) which is not higher than the saturation temperature for moisture content (e.g., 8%) of untreated flue gas A. Consequently, the water, once evaporated, is condensed in flue gas outlet section 21b. During this process, the aforesaid fine dust is captured as the nuclei of condensed water droplets.

(7) When a heat exchanger for recovering heat at any position other than the flue gas outlet section 21b of absorption tower 21 is employed as heat recovery means 12, the temperature of the slurry which comes into gas-liquid contact with flue gas in absorption tower 21 becomes steadily lower than in the prior art. Thus, the absorption reaction of sulfur oxides [i.e., the reaction represented by the above equation (1)] is promoted to bring about an improvement in desulfurization performance.

(8) Moreover, when the amount of heat recovered is controlled so that the temperature of the finally discharged treated flue gas B will be equal to a value (e.g., 38° C.) lower than the saturation temperature for the moisture content of untreated flue gas A, not only the amount of water evaporated and carried away is reduced to zero, but on the contrary, moisture present in untreated flue gas A is condensed and incorporated into the slurry within the absorption tower. Consequently, the supply of water withdrawn in order to remove impurities as described above becomes unnecessary, resulting in a further reduction in the amount of water used.

The present invention is not limited to the flue gas desulfurizer and boiler equipment described above in connection with this embodiment, but may be practiced in various ways. For example, the present invention can be applied to any equipment using a boiler and any equipment requiring a flue gas desulfurizer. That is, similar effects can also be achieved by applying the present invention, for example, to refuse disposal equipment and marine steam engines.

As the heat recovery means, there may be used not only heat exchangers comprising heat transfer tubes as described above, but also a jacket provided on the absorption tower for passing a heating medium therethrough.

Moreover, the heat transport means may also consist, for example, of heat pipes.

Now, thermal electric power generation equipment in accordance with one embodiment of the present invention is described below. First, a steam cycle system for use in this embodiment is explained.

Figure 3:
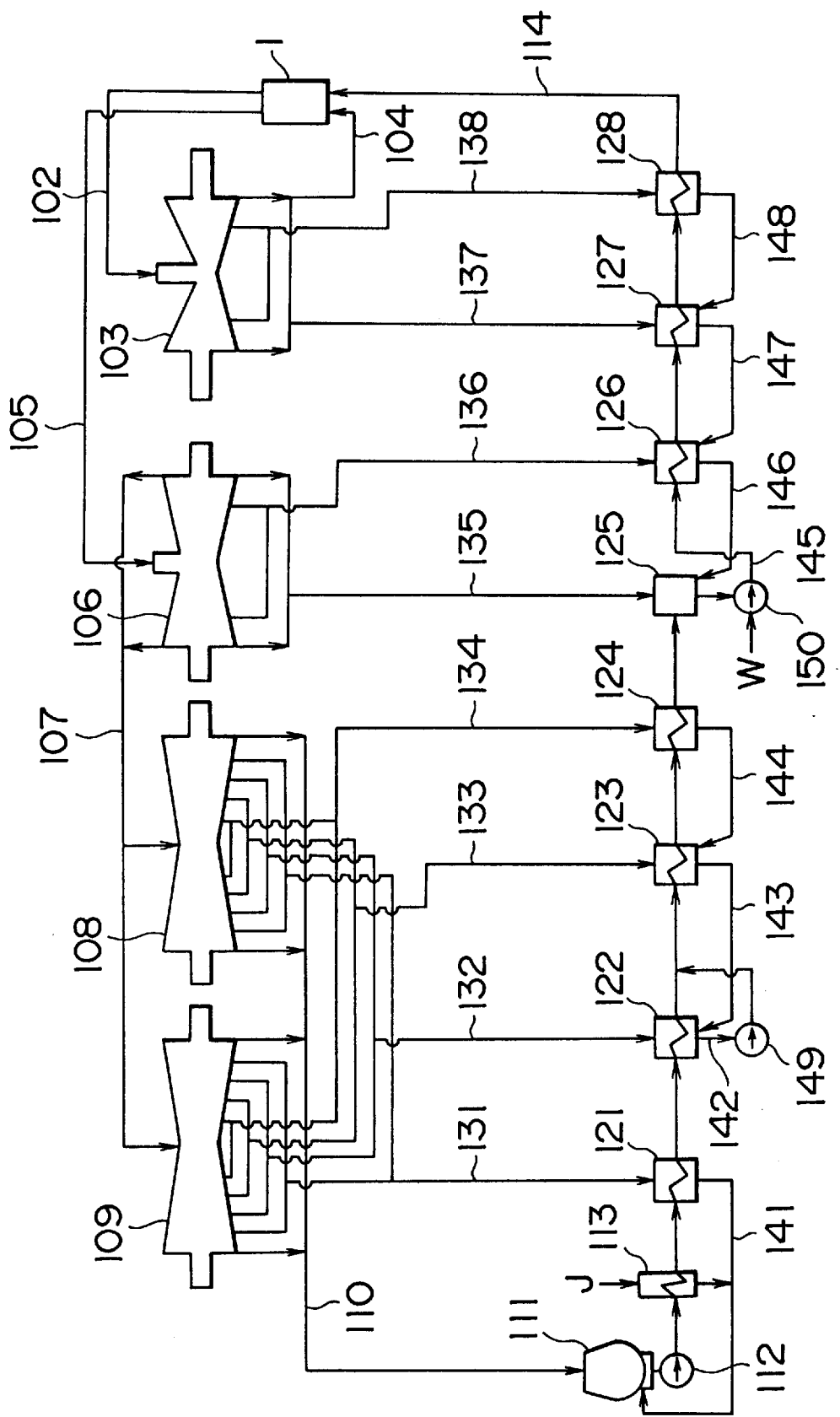
FIG. 3 is a schematic view showing of the typical construction of a steam cycle system for use in thermal electric power generation equipment.

FIG. 3 is a schematic view showing the construction of a steam cycle system for use in this thermal electric power generation equipment.

High-pressure steam generated in a boiler 1 is conveyed through a line 102 and introduced into a high-pressure turbine 103 where it expands and does work by driving turbine blades. Then, the steam is returned to boiler 1 through a line 104, reheated therein, conveyed through a line 105 and introduced into an intermediate-pressure turbine 106 where it does work again. The low-pressure steam which has done work and expanded in intermediate-pressure turbine 106 is conveyed through a line 107 and dividedly introduced into two low-pressure turbines 108 and 109 arranged in parallel, where it does further work. The steam which has done work and expanded in low-pressure turbines 108 and 109 is conveyed through a line 110 and introduced into a steam condenser 111 whose internal pressure is kept negative to condense the steam.

The condensate produced in steam condenser 111 is delivered as boiler feedwater by means of a pump 112 and passed through a heater 113 where it is heated with steam J flowing out of the bearing parts of the turbines. Thereafter, the boiler feedwater is successively heated by a large number of extraction feedwater heaters 121–128 and finally fed to boiler 1 through a line 114.

Extraction feedwater heaters 121, 122, 123 and 124 are extraction feedwater heaters of the so-called surface type in which the boiler feedwater is successively heated with some steam extracted from four stages of low-pressure turbines 108 and 109 through lines 131, 132, 133 and 134, respectively. The steam extracted through line 131, after having passed through extraction feedwater heater 121, is conveyed through a line 141 and introduced into steam condenser 111 where it is condensed to form part of the boiler feedwater. The steam extracted through line 132, after having passed through extraction feedwater heater 122, is conveyed through a line 142 and mixed in the boiler feedwater on the inlet side of extraction feedwater heater 123 to form part of it. The steam extracted through lines 133 and 134, after having passed through extraction feedwater heaters 123 and 124, is conveyed to extraction feedwater heaters 122 and 123 through lines 143 and 144, respectively. Finally, this steam is conveyed through line 142 and mixed in the boiler feedwater on the inlet side of extraction feedwater heater 123 to form part of it.

Extraction feedwater heater 125 is an extraction feedwater heater of the so-called mixing type in which the boiler feedwater is heated by mixing therein some steam extracted from a late stage of intermediate-pressure turbine 106 through a line 135. After being heated by mixing, the boiler feedwater leaves extraction feedwater heater 125 and is introduced into extraction feedwater heater 126 through a line 145.

Extraction feedwater heaters 126, 127 and 128 are extraction feedwater heaters of the surface type in which the boiler feedwater is successively heated with some steam extracted from a middle stage of intermediate-pressure turbine 106 and from middle and late stages of high-pressure turbine 103 through lines 136, 137 and 138, respectively. The steam extracted through line 136, after having passed through extraction feedwater heaters 126, is conveyed through a line 146 and introduced into extraction feedwater heater 125 where it is mixed in the boiler feedwater to form part of it. Similarly, the steam extracted through lines 137 and 138, after having passed through extraction feedwater heaters 127 and 128, is conveyed to extraction feedwater heaters 126 and 127 through lines 147 and 148, respectively. Finally, the steam is introduced into extraction feedwater heater 125 and mixed in the boiler feedwater to form part of it.

Lines 142 and 145 are provided with pumps 149 and 150 for pressurizing and delivering the boiler feedwater, respectively. At pump 150, water W is suitably supplied.

In the case, for example, of a 1,000 MW coal-fired boiler, the temperature of the boiler feedwater is typically about 33° C. at the outlet of steam condenser 111, typically about 34° C. at the outlet of heater 113, typically about 64° C. at the outlet of extraction feedwater heater 121, and typically about 84° C. at the outlet of extraction feedwater heater 122. Finally, the boiler feedwater is typically heated to about 283° C. at the outlet of extraction feedwater heater 128 and fed to boiler 1. In this case, the amount of feedwater introduced into extraction feedwater heater 121 is about 1,830 t/h and the amount of steam extracted from low-pressure turbines 108 and 109 and fed to extraction feedwater heater 121 through line 131 should usually be about 98.2 t/h.

Generally, this thermal electric power generation equipment is provided with a flue gas treatment system in which the flue gas produced in boiler 1 is treated to remove dust, sulfur oxides ($SO_x$) and the like therefrom and discharge the resulting clean flue gas into the atmosphere.

Figure 4:
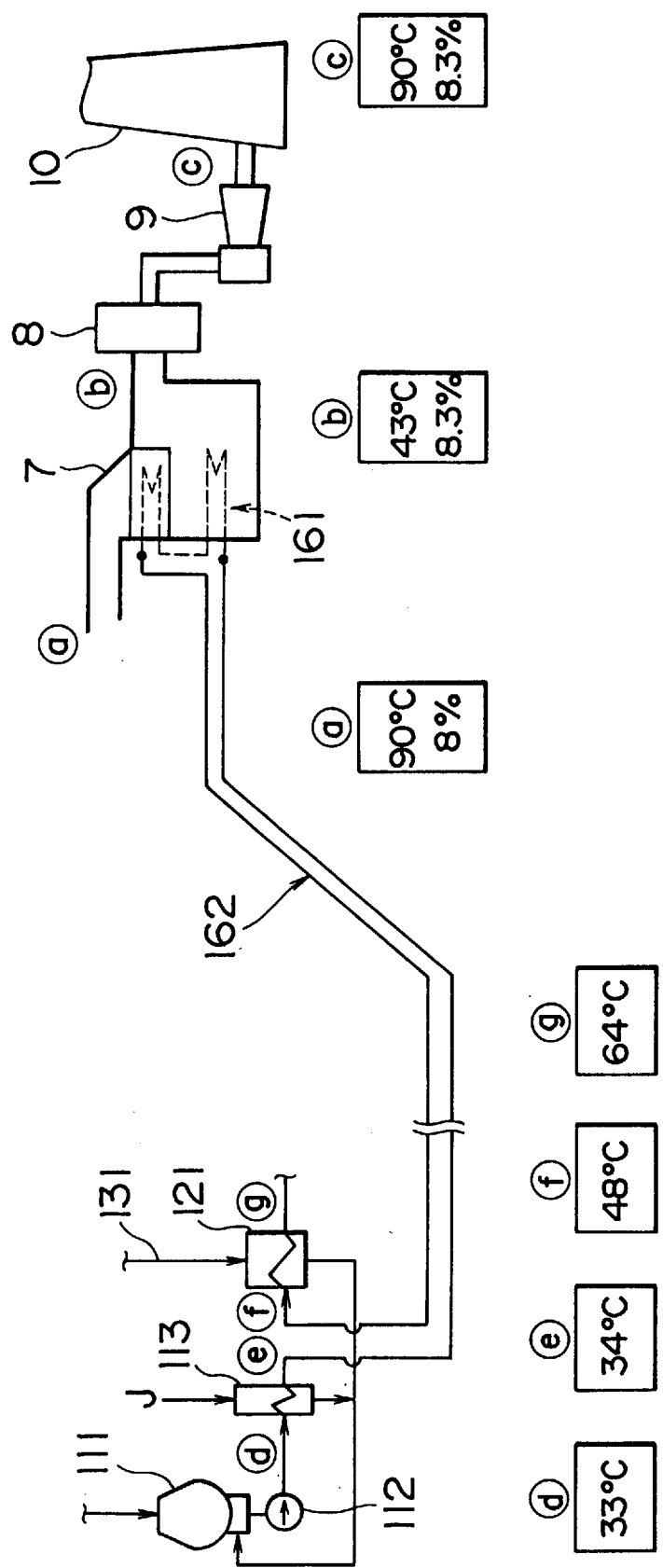
FIG. 4 is a schematic view showing an example of the general construction of thermal electric power generation equipment embodying the present invention and also showing the temperatures and moisture contents of flue gas at various points as calculated for a coal-fired boiler of the 1,000 MW class (in which the amount of water evaporated is about 15 t/h)

In FIG. 4 to which reference is made below, the temperatures and moisture contents of the flue gas at various points of the thermal electric power generation equipment in accordance with this embodiment are shown.

Referring now to FIG. 4, in the thermal electric power generation equipment of the present invention, the condensate produced in steam condenser 111 (by condensing steam from the low-pressure turbines shown in FIG. 3) is introduced into heater 113 by means of pump 112 and heated with steam J flowing out of the bearing parts of the turbines. The heated condensate is conveyed through a line 162 and introduced into the heat recovery means 161 (specifically, in the form of a heat exchanger) of a flue gas desulfurizer 7 where it is heat with flue gas and/or an absorbent slurry. Subsequently, the heated condensate is introduced into extraction feedwater heater 121 where it is further heated with some steam extracted from the low-pressure turbines shown in FIG. 3 through line 131. Finally, this condensate is used as boiler feedwater.

The thermal electric power generation equipment in accordance with this embodiment uses the flue gas desulfurizer which has been described above with reference to FIG. 2.

In the thermal electric power generation equipment constructed in the above-described manner, heat recovery means 161 functions to recover heat from the flue gas passing through absorption tower 21 (FIG. 2) or the absorbent slurry within absorption tower 21, and feedwater is heated by this heat prior to introduction into extraction feedwater heater 121. Consequently, when the temperature of the feedwater on the downstream side of extraction feedwater heater 121 is maintained at the current level, the amount of steam extracted through line 131 can be reduced significantly.

Meanwhile, in flue gas desulfurizer 7, the temperature of treated flue gas B discharged from absorption tower 21 is lowered in proportion to the degree of heat recovery, so that the amount of water carried away by treated flue gas B can be reduced.

For example, when a heat exchanger (comprising heat transfer tube 31) for recovering heat from untreated flue gas A prior to contact with the absorbent slurry is employed as heat recovery means 161, the evaporation from the absorbent slurry in the succeeding gas-liquid contact region can be suppressed in proportion to the degree of cooling of the flue gas, and the steady-state temperature of the slurry within the absorption tower and the steady-state temperature of treated flue gas B can also be lowered correspondingly. Actually, they are affected by the heat generated by the reactions within tank 22, but its effect is very slight and little worth consideration.

Even when a heat exchanger (comprising heat transfer tube 32) for recovering heat from the flue gas present downstream of header pipes 25 (e.g., within packing material 26) and from the slurry, a heat exchanger (comprising heat transfer tube 33) for recovering heat from the slurry within tank 22, or a heat exchanger (comprising heat transfer tube 35) for recovering heat from the absorbent slurry in the pipeline for circulating it, is employed as heat recovery means 161, the heat transmitted, or to be transmitted, from the flue gas to the slurry is recovered continuously. In a steady state, therefore, the evaporation from the absorbent slurry in the gas-liquid contact region can be suppressed in proportion to the degree of cooling, and the steady-state temperature of the slurry within the absorption tower and the steady-state temperature of treated flue gas B can also be lowered correspondingly.

When a heat exchanger (comprising heat transfer tube 36) for recovering heat from the flue gas passing through the flue gas outlet section 21b of absorption tower 21 is employed as heat recovery means 161 and no other heat exchanger is installed, an appreciable amount of steam is once generated in the flue gas inlet section 21a of absorption tower 21 as a result of the gas-liquid contact of untreated flue gas A with the slurry. Thus, the temperature of the slurry and flue gas within the absorption tower is similar to that observed in the prior art (e.g., 48° C.) and the moisture content is also similar to that observed in the prior art (e.g., 11%). However, this flue gas is cooled in flue gas outlet section 21b, so that the water once evaporated is condensed in flue gas outlet section 21b in proportion to the degree of cooling and recovered by mist eliminator 27. Eventually, the amount of water evaporated and carried away from the slurry within the absorption tower can be reduced markedly.

When a combination of various heat exchangers described as above is employed as heat recovery means 161, the evaporation (i.e., the amount of water evaporated and carried away from the slurry) can also be reduced in proportion to the overall degree of cooling by heat recovery.

The present invention is not limited to the above-described embodiment of thermal electric power generation equipment, but may be practiced in various ways. For example, as the heat recovery means of the present invention, there may be used not only heat exchangers comprising heat transfer tubes as described above, but also a jacket provided on the absorption tower for passing a heating medium therethrough.

Moreover, the position at which the boiler feedwater is heated by the heat recovered from the flue gas desulfurizer is not necessarily limited to the inlet side of extraction feedwater heater 121 nearest to the steam condenser as illustrated in connection with the above-described embodiment. For example, the boiler feedwater may be withdrawn from the inlet side of the second extraction feedwater heater 122 and heated in the heat exchanger installed in the absorption tower of the flue gas desulfurizer. Also in this case, similar effects can be achieved, though there may be variation in degree. However, since the temperature of the boiler feedwater at the inlet of extraction feedwater heater 121 nearest to the steam condenser is as low as about 34° C., the above-described embodiment makes it possible to recover heat more efficiently from the flue gas and the like present in the absorption tower.

In the thermal electric power generation equipment of the present invention, the following various effects are produced by employing the above-described construction.

(1) Part of the thermal energy of flue gas produced in a boiler can be utilized to heat feedwater prior to introduction into extraction feedwater heater 121, without altering the construction of the current equipment such as the boiler, turbines and extraction feedwater heaters. This makes it possible to reduce the amount of steam extracted from the low-pressure turbines while maintaining the temperature of the feedwater downstream of the extraction feedwater heater at the current level. Consequently, the power outputs of the low-pressure turbines can be improved far beyond the conventionally recognized limits.

For example, when a heat exchanger for recovering heat from untreated flue gas A (having a temperature of about 90° C.) prior to contact with the absorbent slurry is employed as the heat recovery means for a coal-fired boiler of the 1,000 MW class, the feedwater (having a temperature of about 34° C. and a flow rate of about 1,830 t/h) before being introduced into extraction feedwater heater 121 is heated to about 48° C. as shown in FIG. 4. Consequently, even if the amount of steam extracted from the low-pressure turbines through line 131 and introduced into extraction feedwater heater 121 is decreased from the conventional level of about 98 t/h to about 52 t/h, the temperature of the feedwater at the outlet of extraction feedwater heater 121 can be maintained at the conventional level of about 64° C.

In low-pressure turbines 108 and 109, the specific enthalpy of steam at the position extracted through line 131 is typically about 603 kcal/kg and the specific enthalpy of steam at the position extracted through line 110 (i.e., at the last stage) is typically about 556 kcal/kg. Consequently, the power output can be increased by about $2.16 \times 10^6$ kcal/h $[=(603-556) \times (98 \times 10^3 - 52 \times 10^3)]$.

When expressed on a wattage basis, this value corresponds to about 2,511 kW/h, indicating a power output increase of about 0.25% relative to 1,000 MW. Thus, a significant increase in efficiency can be obtained in thermal electric power generation equipment of this type in which it has been regarded as difficult to achieve higher efficiency.

(2) Since the amount of water evaporated in the absorption tower and carried away by treated flue gas B is markedly decreased, the amount of water supplied to the flue gas desulfurizer (i.e., the amount of water used therein) can be reduced significantly.

In the case, for example, of a coal-fired boiler of the 1,000 MW class, the temperature of treated flue gas B is about 43° C. and its moisture content is about 8.3%, as shown in FIG. 4. Thus, about 60 t/h of water can be saved.

(3) Since the moisture content of treated flue gas B is markedly decreased, the total amount of gas which must be withdrawn from the absorption tower and discharged into the atmosphere through the stack (i.e., treated flue gas B) can be reduced significantly. Consequently, if the cross-sectional areas of the flow paths in the absorption tower and mist eliminator 27 and further in the duct extending to reheating section 8 or stack 10 are maintained at the current levels, the capacity (or power consumption) of back-up fan 9 can be significantly decreased because of a marked reduction in pressure loss. Alternatively, if the capacity (or power consumption) of back-up fan 9 is maintained at the current level, the cross-sectional areas of the flow paths in the absorption tower and the like can be decreased significantly and, therefore, the size of the equipment can be reduced.

(4) When a heat exchanger comprising a heat transfer tube 32 disposed within the packing material 26 of absorption tower 21 is employed as heat recovery means 161, the temperature of packing material 26 can be kept lower than that of the slurry and flue gas passing therethrough, so that little water evaporates at the surfaces of packing material 26. Consequently, the soluble components of the slurry are prevented from precipitating as a result of evaporation to form scale, and the undesirable deposition of scale on packing material 26 can be avoided.

(5) When a heat exchanger installed in the discharge line or suction line of circulating pump 23 is employed as heat recovery means 161, heat can be recovered from the current flue gas desulfurizer by making a simple alteration which comprises, for example, connecting a ready-made heat exchanger in the line.

(6) When a heat exchanger comprising a heat transfer tube 36 disposed in the flue gas outlet section 21b of absorption tower 21 (i.e., upstream of mist eliminator 27 or within the element of mist eliminator 27) is employed as heat recovery means 161, fine dust remaining in treated flue gas B passing through this flue gas outlet section 21b can further be removed.

Specifically, in the flue gas inlet section 21a of absorption tower 21, steam is once generated as a result of the gas-liquid contact of untreated flue gas A with the slurry. Unless other heat exchanges are installed, the temperature of the slurry and flue gas within the absorption tower is similar to that observed in the prior art (e.g., 48° C.) and the moisture content is also similar to that observed in the prior art (e.g., 11%). However, since this flue gas is cooled in flue gas outlet section 21b, the water once evaporated is condensed in flue gas outlet section 21b. During this process, the aforesaid fine dust is captured as the nuclei of condensed water droplets.

(7) When a heat exchanger for recovering heat at any position other than the flue gas outlet section 21b of absorption tower 21 is employed as heat recovery means 161, the temperature of the slurry which comes into gas-liquid contact with flue gas in absorption tower 21 becomes steadily lower than in the prior art. Thus, the absorption reaction of sulfur oxides [i.e., the reaction represented by the above equation (1)] is promoted to bring about an improvement in defulfurization performance.

We claim:

1. Thermal electric power generation equipment, comprising:

a boiler having a steam line and a flue gas exhaust line;

at least one steam turbine in communication with said steam line;

a boiler feedwater line in fluid communication with said boiler for supply of feedwater to said boiler;

a plurality of extraction feedwater heaters in fluid communication with said boiler feedwater line upstream of said boiler for heating said boiler feedwater with steam extracted from said at least one steam turbine;

a flue gas desulfurizer in fluid communication with said exhaust line, said desulfurizer comprising an absorption tower for bringing a flue gas into gas-liquid contact with an absorbent slurry to remove sulfur oxides present in the flue gas, said absorption tower having a flue gas inlet section and a flue gas outlet section, and a circulating pump in communication with the absorbent slurry to circulate the slurry in the absorption tower; and at least one heat exchanger in communication with said boiler feedwater line upstream of said extraction feedwater heaters and operably connected to said exhaust line for recovering heat from the flue gas passing through said absorption tower, said at least one heat exchanger disposed at one or more positions selected from the group consisting of: the flue gas inlet section of the absorption tower, a position within packing material in the desulfurizer, a position inside a bottom tank, a position in fluid communication with the circulating pump, and the flue gas outlet section of the absorption tower;

whereby boiler feedwater is preheated and introduced into said extraction feedwater heaters.

2. Boiler equipment, comprising:

a flue gas exhaust line;

a flue gas desulfurizer in communication with said exhaust line, said desulfurizer comprising an absorption tower, said absorption tower having an absorbent slurry circulating through the tower for treating flue gas by bringing an untreated flue gas into gas-liquid contact with the absorbent slurry, and a circulating pump having a discharge line to circulate the absorbent slurry in said absorption tower;

at least one heat exchanger operably connected to said discharge line of said circulating pump;

heat transport means operably connected to the heat exchanger for transporting heat recovered by the at least one heat exchanger to heat utilization equipment remote from the boiler equipment; and heat release means operably connected to the heat transport means for releasing heat transported by the heat transport means as an energy source for the heat utilization equipment.

3. The boiler equipment of claim 2, further comprising.

an electrostatic precipitator in communication with said exhaust line upstream of said flue gas desulfurizer; and heat recovery means in communication with said exhaust line upstream of said electrostatic precipitator for recovery of energy for reheating a treated flue gas.

* * * * *

UNITED STATES PATENT AND TRADEMARK OFFICE
CERTIFICATE OF CORRECTION

PATENT NO. : 5,878,675

DATED : March 9, 1999

INVENTOR(S) : Iijima et al.

It is certified that error appears in the above-identified patent and that said Letters Patent is hereby corrected as shown below:

On the title page, Item [56],

In the References Cited, U.S. PATENT DOCUMENTS, insert the following references:

| | | | |
|---|---|---|---|
| 3,913,330 | 10/1975 | Horlitz, Jr. | 60/678 |
| 5,676,716 | 10/1997 | Gohara et al. | 55/228 |
| 5,695,723 | 12/1997 | Valentino | 422/177 |
| 4,433,545 | 2/1984 | Chang | 60/678 |
| 4,897,999 | 2/1990 | Varney | 60/678 |

Signed and Sealed this

Third Day of August, 1999

Attest:

Q. TODD DICKINSON

*Attesting Officer*  *Acting Commissioner of Patents and Trademarks*